United States Patent
Scherz (10) Patent No.: US 11,848,493 B2
(45) Date of Patent: Dec. 19, 2023

(54) ANTENNA UNIT, RADAR SYSTEM AND METHOD FOR ADJUSTING AN ANTENNA PARAMETER

(71) Applicant: Infineon Technologies AG, Neubiberg (DE)

(72) Inventor: Philipp Scherz, Linz (AT)

(73) Assignee: Infineon Technologies AG, Neubiberg (DE)

( * ) Notice: Subject to any disclaimer, the term of this patent is extended or adjusted under 35 U.S.C. 154(b) by 351 days.

(21) Appl. No.: 17/196,118

(22) Filed: Mar. 9, 2021

(65) Prior Publication Data

US 2021/0296767 A1    Sep. 23, 2021

(30) Foreign Application Priority Data

Mar. 19, 2020 (DE) .......................... 102020107691.6

(51) Int. Cl.
| | |
|---|---|
| *H01Q 1/52* | (2006.01) |
| *H04B 7/08* | (2006.01) |
| *H04B 7/06* | (2006.01) |
| *H01Q 1/12* | (2006.01) |
| *G01S 13/02* | (2006.01) |
| *G01S 7/282* | (2006.01) |

(52) U.S. Cl.
CPC ............. *H01Q 1/523* (2013.01); *G01S 7/282* (2013.01); *G01S 13/02* (2013.01); *H01Q 1/125* (2013.01); *H04B 7/0682* (2013.01); *H04B 7/086* (2013.01); *G01S 2013/0245* (2013.01)

(58) Field of Classification Search
None
See application file for complete search history.

(56) References Cited

U.S. PATENT DOCUMENTS

| | | | |
|---|---|---|---|
| 4,090,204 | A | 5/1978 | Farhat |
| 10,211,902 | B1 | 2/2019 | Iannotti et al. |
| 2003/0189511 | A1 | 10/2003 | Lasky et al. |
| 2003/0202731 | A1 | 10/2003 | Ionov et al. |
| 2013/0281890 | A1 | 10/2013 | Mishelevich |
| 2017/0365923 | A1 | 12/2017 | Schmutzler et al. |

(Continued)

FOREIGN PATENT DOCUMENTS

| | | |
|---|---|---|
| DE | 10109343 C2 | 1/2003 |
| NZ | 583154 A | 9/2011 |
| WO | 2019036567 A1 | 2/2019 |

OTHER PUBLICATIONS

EP0840140B1 translation (Year: 1997).*

*Primary Examiner* — Whitney Moore
(74) *Attorney, Agent, or Firm* — Harrity & Harrity, LLP (57) ABSTRACT

An antenna unit includes an antenna having at least two elements for emitting and/or receiving electromagnetic radiation. The antenna is arranged on a support substrate. Furthermore, the antenna unit includes an electromechanical actuator that is arranged on the support substrate and configured to take a control signal as a basis for mechanically deforming the support substrate along a spatial direction in order to adjust a distance between the at least two elements of the antenna along the spatial direction for the purpose of influencing an antenna parameter of the antenna. The antenna unit also includes a control circuit configured to generate the control signal based on a target value for the antenna parameter.

20 Claims, 4 Drawing Sheets

(56) References Cited

U.S. PATENT DOCUMENTS

| | | |
|---|---|---|
| 2018/0081037 A1 | 3/2018 | Medina et al. |
| 2018/0219286 A1 | 8/2018 | Lee et al. |
| 2018/0231657 A1* | 8/2018 | Woehlte ............... H01Q 1/3233 |
| 2018/0335516 A1 | 11/2018 | Daniel et al. |

* cited by examiner

ANTENNA UNIT, RADAR SYSTEM AND METHOD FOR ADJUSTING AN ANTENNA PARAMETER

FIELD

The present disclosure relates to an antenna unit, a radar system, and a method for adjusting an antenna parameter.

BACKGROUND

Antenna parameters such as antenna directionality are conventionally controlled using analog or digital methods.

For example, analog methods involve the use of phase shifters in order to shift the phases of multiple antennas with respect to one another and to influence the main radiating or main receiving direction. Phase shifters can be produced inexpensively only with difficulty. Inexpensive phase shifters are usually susceptible to temperature variations and hence unsuited to many areas of application (e.g. in vehicles).

In digital methods the signals received by antennas are arithmetically evaluated in order to influence the main receiving direction. However, this requires each individual antenna to cover the entire measurement field, which means that the individual antenna is susceptible to interference from external transmitters.

SUMMARY

There is therefore a need to provide an improved way of adjusting an antenna parameter.

This need can be covered by the subject matter of the patent claims.

One exemplary embodiment relates to an antenna unit. The antenna unit includes an antenna having at least two elements for emitting and/or receiving electromagnetic radiation. The antenna is arranged on a support substrate. Furthermore, the antenna unit includes an electromechanical actuator that is arranged on the support substrate and configured to take a control signal as a basis for mechanically deforming the support substrate along a spatial direction in order to adjust a distance between the at least two elements of the antenna along the spatial direction for the purpose of influencing an antenna parameter of the antenna. The antenna unit also includes a control circuit configured to generate the control signal based on a target value for the antenna parameter.

A further exemplary embodiment relates to a radar system including an antenna unit based on the proposed technology and a radar chip coupled to the antenna of the antenna unit.

Moreover, one exemplary embodiment relates to a method for adjusting an antenna parameter of an antenna having at least two elements for emitting and/or receiving electromagnetic radiation. The antenna is arranged on a support substrate. The method includes generating a control signal for an electromechanical actuator arranged on the support substrate based on a target value for the antenna parameter. Furthermore, the method includes adjusting a distance between the at least two elements of the antenna along a spatial direction for the purpose of influencing the antenna parameter by mechanically deforming the support substrate along the spatial direction by means of the electromechanical actuator and based on the control signal.

BRIEF DESCRIPTION OF THE DRAWINGS

Some examples of apparatuses and/or methods are explained in greater detail merely by way of illustration below with reference to the accompanying figures, in which.

DETAILED DESCRIPTION

Various examples will now be described more thoroughly with reference to the accompanying figures, which depict some examples. In the figures, the thicknesses of lines, layers and/or regions may be exaggerated for clarification purposes.

While further examples are suitable for various modifications and alternative forms, some specific examples thereof are correspondingly shown in the figures and are described thoroughly below. However, this detailed description does not restrict further examples to the specific forms described. Further examples can cover all modifications, counterparts and alternatives that fall within the scope of the disclosure. Throughout the description of the figures, identical or similar reference signs refer to identical or similar elements that can be implemented identically or in modified form in a comparison with one another, while they provide the same or a similar function.

It goes without saying that if one element is designated as "connected" or "coupled" to another element, the elements can be connected or coupled directly or via one or more intermediate elements. If two elements A and B are combined using an "or", this should be understood such that all possible combinations are disclosed, i.e., only A, only B, and A and B, unless explicitly or implicitly defined otherwise. An alternative wording for the same combinations is "at least one from A and B" or "A and/or B". The same applies, mutatis mutandis, to combinations of more than two elements.

The terminology used here to describe specific examples is not intended to have a limiting effect for further examples. When a singular form e.g., "a", "an", and "the" is used, and the use of only a single element is defined neither explicitly nor implicitly as obligatory, further examples can also use plural elements in order to implement the same function. If a function is described below as implemented using multiple elements, further examples can implement the same function using a single element or a single processing entity. Furthermore, it goes without saying that the terms "comprises", "comprising", "has" and/or "having" in their usage make more precise the presence of the indicated features, integers, steps, operations, processes, elements, components, and/or a group thereof, but do not exclude the presence or addition of one or more other features, integers, steps, operations, processes, elements, components and/or a group thereof.

Unless defined otherwise, all terms (including technical and scientific terms) are used here in their customary meaning in the field with which examples are associated.

Figure 1:
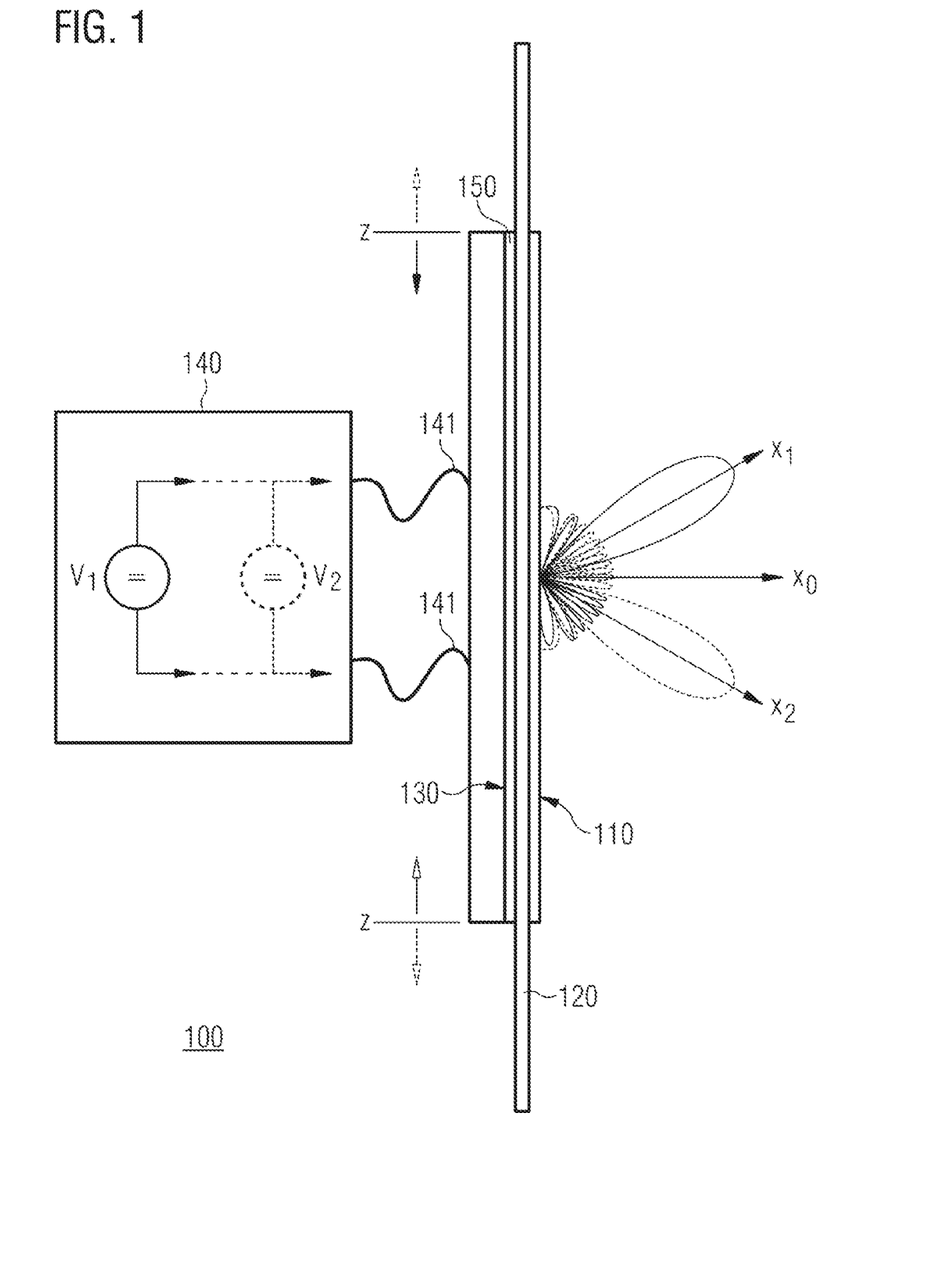
FIG. 1 shows a side view of an exemplary embodiment of an antenna unit.
Figure 2:
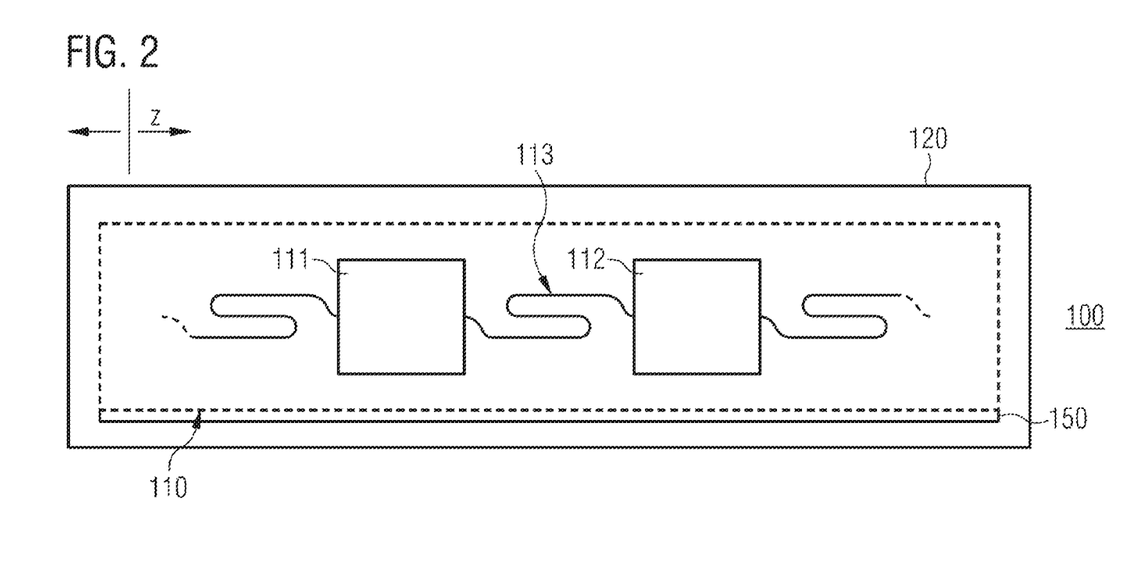
FIG. 2 shows a plan view of the exemplary embodiment shown in FIG. 1.

FIG. 1 together with FIG. 2 shows an exemplary embodiment of an antenna unit 100. FIG. 1 shows a side view of the antenna unit 100, whereas FIG. 2 shows a plan view of the antenna unit 100.

The antenna unit 100 comprises a support substrate 120 on which an antenna 110 is arranged. For example, the support substrate 120 can be a printed circuit board (PCB).

The antenna 110 comprises at least two elements 111 and 112 for emitting and/or receiving electromagnetic radiation. Optionally, the antenna 110 can also comprise further elements for emitting and/or receiving electromagnetic radiation. In FIG. 2 the elements 111 and 112 of the antenna 110 are embodied as patch antennas (or patch elements), but the elements 111 and 112 of the antenna 110 may also be embodied differently. For example, the antenna 110 may alternatively also be in the form of a slot antenna, the at least two elements of the antenna 100 being slots in the slot antenna.

Furthermore, the antenna unit 100 comprises an electromechanical actuator 130 arranged on the support substrate 120. The electromechanical actuator 130 is a unit that converts an electrical signal into mechanical movement. For example, the electromechanical actuator 130 may be a piezomechanical actuator. The electromechanical actuator 130 is configured to take a control signal 141 as a basis for mechanically deforming the support substrate 120 along a spatial direction z in order to adjust a distance between the at least two elements 111 and 112 of the antenna 110 along the spatial direction z for the purpose of influencing an antenna parameter of the antenna 110. The electromechanical actuator 130 and the antenna 110 can be arranged on different sides (e.g. front and rear) or surfaces of the support substrate 120, as indicated in FIG. 1 and FIG. 2. Alternatively, the electromechanical actuator 130 and the antenna 110 can also be arranged on the same side or surface of the support substrate 120.

A control circuit 140 of the antenna unit 100 is configured to generate the control signal 141 based on a target value or a desired value for the antenna parameter.

The two elements 111 and 112 of the antenna 110 are in a phase relationship with respect to one another that is dependent on the distance of the two elements 111 and 112 from one another. By adjusting or varying the distance between the at least two elements 111 and 112 of the antenna 110 along the spatial direction z it is possible for the phase relationship of the two elements 111 and 112 of the antenna 110 with respect to one another to be adjusted or changed. The antenna parameter is a parameter that is dependent on the phase relationship of the two elements 111 and 112 of the antenna 110 with respect one another and is therefore adjustable by means of the mechanical deformation of the support substrate 120 along the spatial direction z.

For example, the antenna parameter can be a main focus direction of the antenna 110 or a variation of the angular resolution of a group antenna or of an antenna array. The main focus direction of the antenna 110 denotes the direction of the main lobe of the antenna 110 in the antenna pattern. The main focus direction of the antenna 110 therefore denotes the direction in which the antenna emits the maximum amount of electromagnetic radiation and/or has the maximum reception sensitivity for electromagnetic radiation.

The adjustment of the main focus direction of the antenna 110 in response to the control signal 141 is indicated in FIG. 1. In this case it is assumed that the control signal 141 is a voltage signal. Depending on the design of the electromechanical actuator 130, however, the control signal can also be any other signal such as for example a current signal. If a first voltage $V_1$ is applied to the electromechanical actuator 130 as control signal 141 in the example of FIG. 1, said electromechanical actuator deforms the support substrate 120 along the spatial direction z such that the distance of the two elements 111 and 112 from one another decreases. If a second voltage $V_2$, which is different than the first voltage $V_1$, is applied to the electromechanical actuator 130 as control signal 141, said electromechanical actuator deforms the support substrate along the spatial direction z such that the distance of the two elements 111 and 112 from one another increases.

If the support substrate 120 is not deformed by the electromechanical actuator 130, the main focus direction of the antenna 110, i.e., the direction of the main lobe of the antenna 110, is the direction $x_0$ perpendicular to that surface of the support substrate 120 on which the antenna 110 is arranged. On account of the change in the phase relationship of the two elements 111 and 112 with respect to one another during the mechanical deformation of the support substrate 120 based on the first voltage $V_1$, the main focus direction of the antenna 110 changes to the direction $x_1$. Accordingly, the main focus direction of the antenna 110 changes to the direction $x_2$ on account of the change in the phase relationship of the two elements 111 and 112 with respect one another during the mechanical deformation of the support substrate 120 based on the second voltage $V_2$. The main focus direction of the antenna 110 can therefore be adjusted to a target value.

The antenna parameter can also be any other parameter that reacts sensitively to the distance between the at least two elements 111 and 112 of the antenna 110, however. For example, the antenna parameter can also be an angular resolution of the antenna 110 or an aperture angle of the antenna 110. By moving the local scanning (spatial scan points) it is possible to obtain a higher angular resolution and a lack of ambiguity for the spatial directions of the received signals (Direction of Arrival=DoA).

Furthermore, the mechanical deformation of the support substrate 120 can also be used to deform the at least two elements 111 and 112 of the antenna 110 itself. For example, the at least two elements 111 and 112 of the antenna 110 can be compressed or expanded along the spatial direction z. The deformation of the at least two elements 111 and 112 of the antenna 110 itself can also allow the antenna parameter to be influenced.

It is also possible for additional electromechanical actuators (not depicted) to be arranged on the support substrate and actuated by the control circuit 140 by means of appropriate further control signals in order to adjust the distance between the at least two elements 111 and 112 of the antenna 110 for the purpose of influencing the antenna parameter. The further electromechanical actuators can be arranged or configured to mechanically deform the support substrate 120 along the spatial direction z or else along a different spatial direction.

The proposed antenna unit 100 allows the antenna parameter to be adjusted by means of the combination of a specially designed antenna with at least one electromechanical actuator. Focusing antennas consist of multiple radiating and receiving elements that are in a special phase relationship, so that the main focus of the antennas reacts sensitively to the distance between the elements. If these distances are now adjusted using, e.g., a piezoelectric actuator, the main radiating and main receiving directions can be adjusted.

The antenna unit 100 can optionally also comprise a sensor 150 configured to determine a measured value for the distance between the at least two elements 111 and 112 of the antenna 110 along the spatial direction z. For example, the sensor 150 can comprise a strain gauge in this regard for measuring the deflection of the electromechanical actuator 130 or for measuring the distance between the at least two elements 111 and 112 of the antenna 110 along the spatial direction z. The control circuit 140 can also be configured to generate the control signal 141 based on the measured value. Accordingly, the actual deflection of the electromechanical actuator 130 or the actual distance between the at least two elements 111 and 112 of the antenna 110 along the spatial direction z can be determined and taken into consideration for actuating the electromechanical actuator 130. In this way e.g., temperature effects such as temperature-dependent changes of length of the electromechanical actuator 130 or temperature-dependent changes of the distance between the at least two elements 111 and 112 of the antenna 110 can be detected and taken into consideration or compensated for by the control circuit 140.

The antenna unit 100 can be used to control an antenna parameter of the antenna 110 (e.g. the direction of focus) using a single actuator. In comparison with a conventional approach using phase shifters, in which every radiating and receiving element of the antenna requires a separate phase shifter, which also have individual temperature responses that can be controlled only with difficulty, however, the antenna unit 100 can allow much simpler compensation for temperature.

As depicted in FIG. 2 the at least two elements 111 and 112 of the antenna 110 can be coupled to one another via an (electrical) line 113 running on the support substrate 120. Accordingly, a length of the (electrical) line 113 can also be varied by the electrochemical actuator 130 depending on the mechanical deformation of the support substrate 112 along the spatial direction z. The change of length of the electrical line 113 can likewise be used to influence the antenna parameter.

The electromechanical actuator 130 may, e.g., be capable of mechanically deforming the support substrate 120 along the spatial direction z by at least 1%, 5%, 10%, 15% or 20% of a wavelength of the electromagnetic radiation emitted and/or received by the antenna 110. The deflection that is set using the electromechanical actuator 130 can therefore be in the percentage range of the wavelength of the electromagnetic radiation. For example, the actuator can be capable of mechanically deforming the support substrate 120 along the spatial direction z by up to 25% or 50% of the wavelength of the electromagnetic radiation emitted and/or received by the antenna 110. With piezo actuators it is possible to achieve deflections in the region of approximately 100 µm, for example.

If the electromechanical actuator 130 allows only small deflections of the support substrate 120 to be achieved or if only small defections of the support substrate 120 are desired in order to limit the mechanical stress in the support substrate 120, the electrical line 130 can run meandrously on the support substrate, for example. The meandrous route of the electrical line 113 allows a desired change of length of the electrical line 113 for the purpose of influencing the antenna parameter to be achieved even with small deflections of the support substrate 120 by the electromechanical actuator 130.

In some exemplary embodiments the control circuit 140 can also be designed to generate the control signal 141 such that the main focus direction of the antenna 110 oscillates along the spatial direction z or moves periodically to and fro along the spatial direction z. Accordingly, a spatial region can be continuously irradiated or scanned along spatial direction z.

Figure 3:
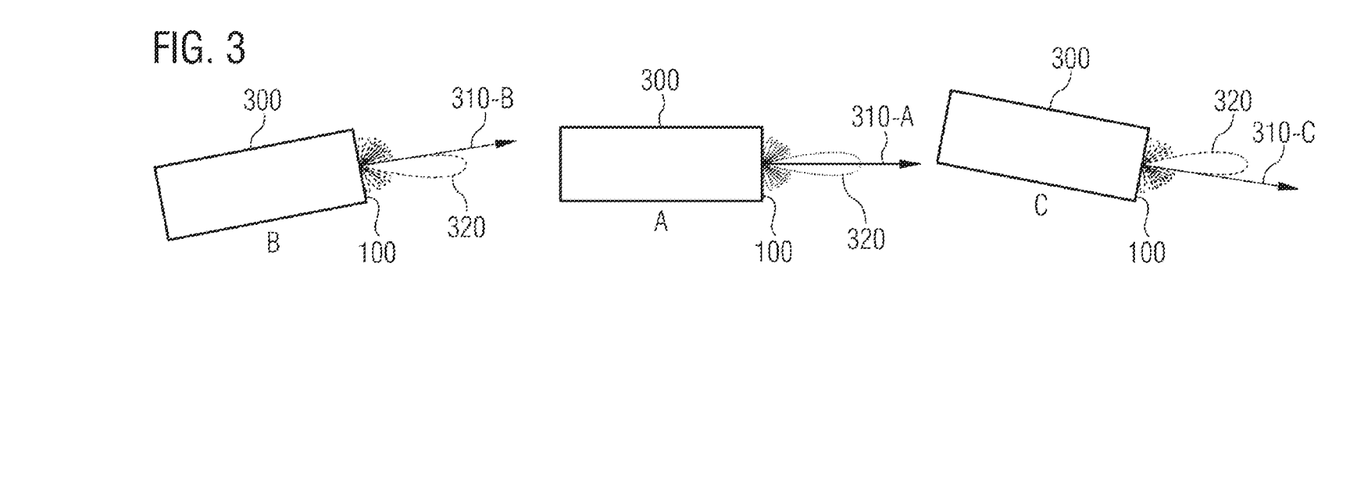
FIG. 3 shows an exemplary embodiment of an antenna unit in different alignments.

The control circuit 140 can also be configured to generate the control signal 141 based on information concerning an orientation of the antenna unit 100 (i.e., an alignment of the antenna unit 100 in space). If the antenna unit 100 is, e.g., not mounted in a desired installation direction or is deliberately installed such that the antenna unit 100 is somewhat inclined in relation to a reference direction, the information about this can be taken into consideration by the control circuit 140 and, e.g., the main focus direction of the antenna 110 can be adapted and if necessary adjusted for the reference direction by appropriately actuating the electromechanical actuator 130. If the antenna unit 100 is, e.g., used in a vehicle, different loads of the vehicle can also be balanced in this manner. This is indicated by way of illustration in FIG. 3, which shows three different loading states A, B and C of a vehicle 300. In loading state A the vehicle 300 is loaded evenly, which means that the vehicle 300 is aligned substantially horizontally, as indicated by the arrow 310-A. Accordingly the main lobe of the antenna 110 points in the direction of the horizontal when there is no deformation of the support substrate 120 by the electromechanical transducer. In loading state B the vehicle is loaded unevenly, which means that the vehicle 300 "is looking upward" and is therefore not aligned horizontally, as indicated by the arrow 310-B. In loading state C the vehicle is likewise loaded unevenly, which means that the vehicle 300 "is looking downward" and is therefore not aligned horizontally, as indicated by the arrow 310-C. Accordingly, the antenna unit 100 is also not aligned along the horizontal for loading states B and C. However, this can be compensated for (e.g., virtually statically) by adjusting the main focus direction of the antenna 110 by means of deformation of the support substrate 120 by the electromechanical actuator 130, as a result of which the main lobe of the antenna 110 also points in the direction of the horizontal for loading states B and C. The information about the loading of the vehicle 300 or the resultant orientation of the vehicle 300 or of the antenna unit 100 can be used to balance these when adjusting the main focus direction of the antenna 110. If the antenna unit 100 is, e.g., used in a radar system of the vehicle 300 to emit or receive radar signals, it is thus possible to ensure that the radar looks in a desired direction regardless of the loading state of the vehicle 300.

Figure 4:
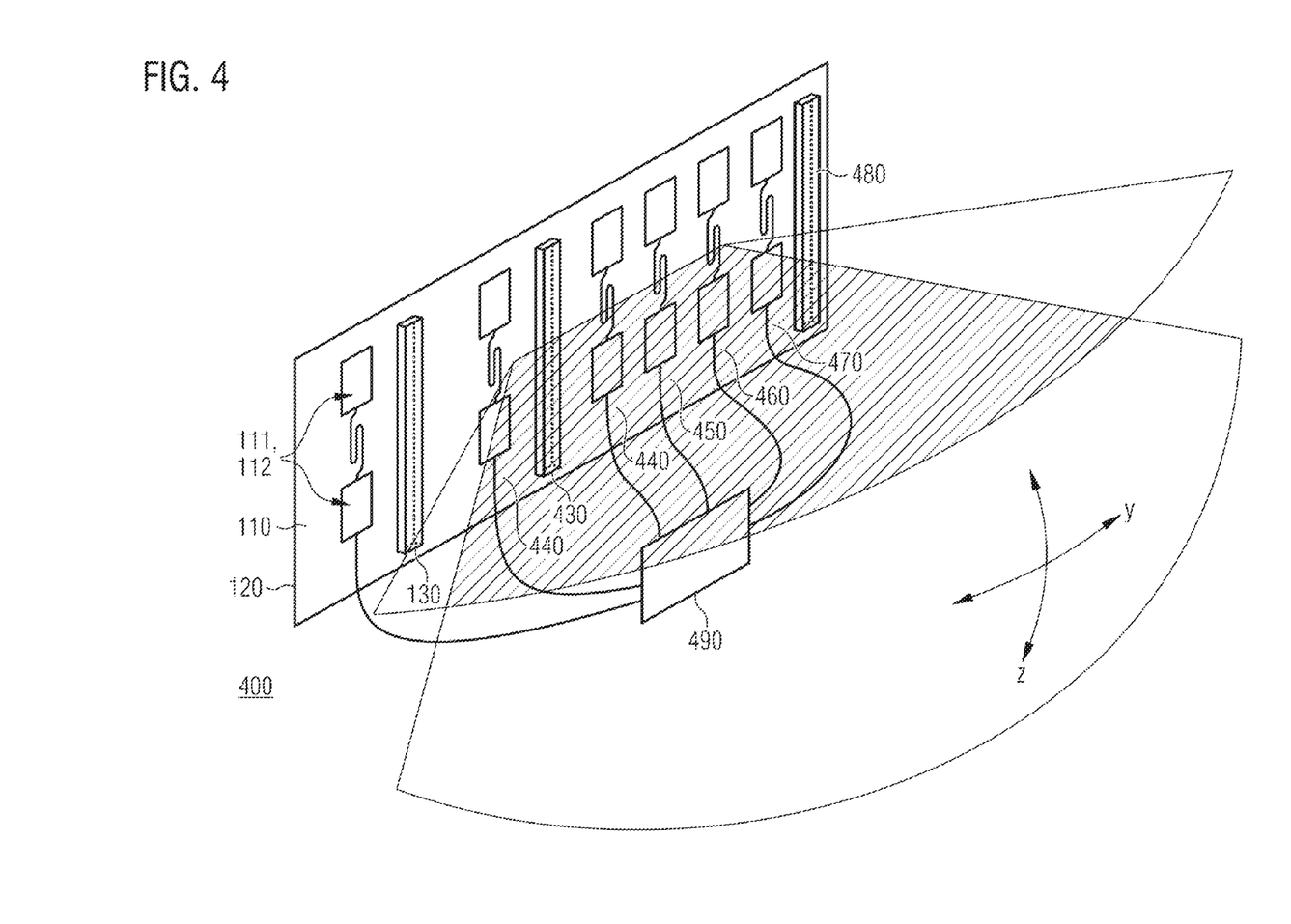
FIG. 4 shows a radar system.

FIG. 4 shows a radar system 400 that uses the proposed technology for adjusting an antenna parameter.

The radar system 400 comprises an antenna unit as described above having an antenna 110 and an electromechanical actuator 130, both of which are arranged on a support substrate 120. The electromechanical actuator 130 can be used to deform the support substrate 120 in order to vary the distance between the two elements 111 and 112 of the antenna 110 for emitting and/or receiving electromagnetic radiation for the purpose of influencing an antenna parameter of the antenna 110. The control circuit for actuating the electromechanical actuator 130 is not depicted in FIG. 4 for reasons of clarity.

The radar system 400 also comprises a radar chip 490 coupled to the antenna 110. The radar chip 490 is at least configured to process a radar received signal generated based on electromagnetic radiation received by the antenna 110 and/or to generate a radar transmission signal needing to be emitted as electromagnetic radiation by the antenna 110. For example, the radar transmission signal and the radar received signal can have a frequency of more than 70 GHz (e.g. in a frequency band from 76 to 81 GHz).

The deformation of the support substrate 120 can be used, e.g., to adjust the main focus direction of the antenna 110 so as to emit the radar transmission signal to a predetermined spatial region or to be particularly sensitive to the radar received signal in the predetermined spatial region.

As indicated in FIG. 4 the antenna unit can also comprise a further antenna 410 having at least two further elements 411 and 412 for emitting and/or receiving electromagnetic radiation. The further antenna 410 is also arranged on a support substrate. Accordingly, the electromechanical actuator 130 can also adjust a distance between the at least two further elements 411 and 412 of the further antenna 410 along the spatial direction z for the purpose of influencing an antenna parameter of the further antenna 410 by mechanically deforming the support substrate 120 along the spatial direction z.

In the exemplary embodiment depicted in FIG. 4 the antenna 110 and the further antenna 410 form a group antenna or an antenna array. For example, the group antenna formed by the antenna 110 and the further antenna 410 can be used in the radar system 400 as a transmitting antenna for emitting overlaid radar transmission signals. If a respective main focus direction of the antenna 110 and of the further antenna 410 along the spatial direction z are chosen as antenna parameters for the antenna 110 and the further antenna 410, it is accordingly possible to adjust a main focus direction of the group antenna formed by the antenna 110 and the further antenna 410. The mechanical deformation of the support substrate 120 can therefore be used to effect beam steering of the electromagnetic radiation emitted by the group antenna along the spatial direction z for the radar measurement. In this way, the electromagnetic radiation can be emitted to a desired spatial region. The control circuit for the electromechanical actuator 130 can be configured for example to generate the control signal for the electromechanical actuator 130 such that the main focus direction of the group antenna oscillates along the spatial direction z (i.e., moves periodically to and fro along the spatial direction z).

Beam steering along a further spatial direction x, which is different than the spatial direction z, can be effected, e.g., by means of digital beam steering methods. For example, the radar chip 490 can be configured to generate radar transmission signals having a predetermined phase relationship with respect to one another for the antenna 110 and the further antenna 410 in order to adjust the main focus direction of the group antenna formed by the antenna 110 and the further antenna 410 along the further spatial direction x. According to one exemplary embodiment the beam steering of the electromagnetic radiation emitted by the group antenna for the radar measurement can be effected in the elevation direction z by means of mechanical deformation of the support substrate 120 and in the azimuth direction x by means of digital beam steering.

The group antenna formed by the antenna 110 and the further antenna 410 can also be used, according to exemplary embodiments, as a receiving antenna for reflected radar signals. In this case, the mechanical deformation of the support substrate 120 can also be used to adjust the sensitivity of the group antenna formed by the antenna 110 and the further antenna 410 in the elevation direction z. The sensitivity of the group antenna in the further spatial direction x (e.g. the azimuth direction) can be achieved by means of digital beamforming. To this end the radar chip 490 can be configured to digitally process radar received signals of the antenna 110 and of the further antenna 410 in order to perform a digital beamforming processing in the further spatial direction x.

Combining mechanical deformation of the support substrate 120 in order to adjust the main focus direction in the elevation direction z with the digital methods for adjusting the main focus direction in the azimuth direction x can allow high angular resolution in the elevation direction z without using additional and hence expensive radio-frequency channels.

As indicated in FIG. 4, mechanical deformation of the support substrate 120 can also be achieved by virtue of one or more further electromechanical actuators 430 and 470 being arranged on the support substrate and being appropriately actuated by the control circuit, which is not depicted. The number of electromechanical actuators used can be chosen, e.g., depending on the size and/or the number of antennas used.

Similarly, as indicated in FIG. 4, different antennas can be used for emitting and receiving electromagnetic radiation. As indicated above the antennas 110 and 410 can be used, e.g., as a group antenna for emitting electromagnetic radiation. Furthermore, further antennas 440, 450, 460 and 470 can additionally be used as a group antenna for receiving electromagnetic radiation. The electromechanical actuators 430 and 470 can also be used to adjust the antenna parameters of the further antennas 440, 450, 460 and 470 and therefore to adjust, e.g., the main focus direction of this group antenna. The further antennas 440, 450, 460 and 470 are also coupled to the radar chip 490, which means that the radar chip can process the radar received signals of the antennas 440, 450, 460 and 470 according to the principles described above.

The radar system 400 can be used, e.g., in vehicles in order to allow control of the main radiating and main receiving directions of the antennas of the radar system. Accordingly, a radar measurement can be performed in targeted fashion in desired spatial regions in the surroundings of the vehicle.

Figure 5:
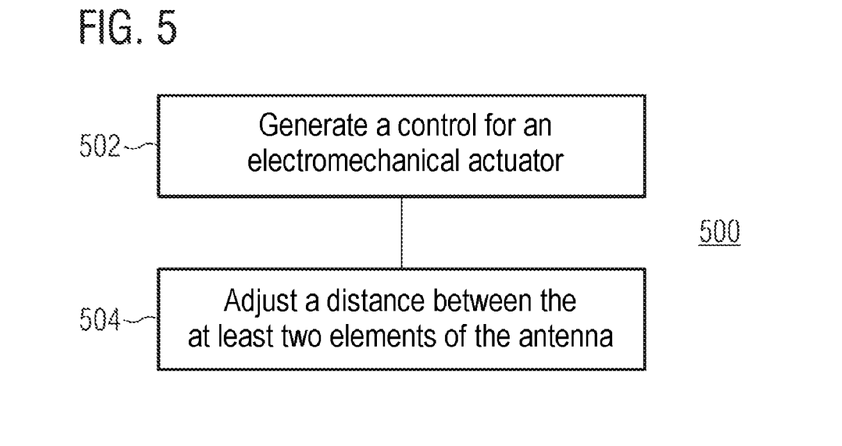
FIG. 5 shows a flowchart of an exemplary embodiment of a method for adjusting an antenna parameter.

To summarize the above-described aspects of the adjustment of antenna parameters once more, FIG. 5 also shows a flowchart of a method 500 for adjusting an antenna parameter of an antenna having at least two elements for emitting and/or receiving electromagnetic radiation. The antenna is arranged on a support substrate. The method 500 comprises generating 502 a control signal for an electromechanical actuator arranged on the support substrate based on a target value for the antenna parameter. Furthermore, the method 500 comprises adjusting 504 a distance between the at least two elements of the antenna along a spatial direction for the purpose of influencing the antenna parameter by mechanically deforming the support substrate along the spatial direction by means of the electromechanical actuator and based on the control signal.

The method 500 allows the antenna parameter to be adjusted by varying the distance between the at least two elements of the antenna. The antenna parameter can be, e.g., a main focus direction of the antenna.

Further details and aspects of the method are described above in association with further exemplary embodiments (e.g. FIGS. 1 to 4). The method can comprise one or more optional features according to the further exemplary embodiments. For example, the method 500 can also comprise determining a measured value for the distance between the at least two elements of the antenna along the spatial direction by means of a sensor. Accordingly, the generating of the control signal can then also be based on the measured value.

The exemplary embodiments described herein can be summarized as follows:

Some exemplary embodiments concern an antenna unit. The antenna unit comprises an antenna having at least two elements for emitting and/or receiving electromagnetic radiation. The antenna is arranged on a support substrate.

Furthermore, the antenna unit comprises an electromechanical actuator that is arranged on the support substrate and configured to take a control signal as a basis for mechanically deforming the support substrate along a spatial direction in order to adjust a distance between the at least two elements of the antenna along the spatial direction for the purpose of influencing an antenna parameter of the antenna. The antenna unit also comprises a control circuit configured to generate the control signal based on a target value for the antenna parameter.

In some exemplary embodiments the antenna unit also comprises a sensor configured to determine a measured value for the distance between the at least two elements of the antenna along the spatial direction, wherein the control circuit is further configured to generate the control signal based on the measured value.

According to some exemplary embodiments the antenna parameter is a main focus direction of the antenna.

In some exemplary embodiments the control circuit is further configured to generate the control signal based on information concerning an orientation of the antenna unit.

According to some exemplary embodiments the at least two elements of the antenna are coupled to one another via a line running on the support substrate, wherein a length of the line varies depending on the mechanical deformation of the support substrate along the spatial direction by the electromechanical actuator.

In some exemplary embodiments the line runs meandrously on the support substrate.

According to some exemplary embodiments the electromechanical actuator is a piezomechanical actuator.

In some exemplary embodiments the at least two elements of the antenna are patch antennas.

Alternatively, the antenna is a slot antenna, the at least two elements of the antenna being slots in the slot antenna.

According to some exemplary embodiments the electromechanical actuator is capable of mechanically deforming the support substrate along the spatial direction by at least 1% of a wavelength of the electromagnetic radiation. In other exemplary embodiments the support substrate can be mechanically deformed along the spatial direction by at least 5%, 10%, 15% or 20% of a wavelength of the electromagnetic radiation.

In some exemplary embodiments the support substrate is a printed circuit board.

Further exemplary embodiments concern a radar system comprising an antenna unit based on the proposed technology and a radar chip coupled to the antenna of the antenna unit.

According to some exemplary embodiments the radar chip is configured to process a radar received signal generated based on electromagnetic radiation received by the antenna and/or to generate a radar transmission signal needing to be emitted as electromagnetic radiation by the antenna.

In some exemplary embodiments the antenna unit comprises a further antenna having at least two further elements for emitting and/or receiving electromagnetic radiation, wherein the further antenna is arranged on the support substrate, and wherein the electromechanical actuator is configured to use the mechanical deformation of the support substrate along the spatial direction to adjust a distance between the at least two further elements of the further antenna along the spatial direction for the purpose of influencing an antenna parameter of the further antenna.

According to some exemplary embodiments the antenna parameters of the antenna and of the further antenna are a respective main focus direction of the antenna and of the further antenna along the spatial direction in order to adjust a main focus direction of a group antenna formed by the antenna and the further antenna.

In some exemplary embodiments the control circuit is configured to generate the control signal such that the main focus direction of the group antenna oscillates along the spatial direction.

According to some exemplary embodiments the radar chip is configured to generate radar transmission signals having a predetermined phase relationship with respect to one another for the antenna and the further antenna in order to adjust the main focus direction of the group antenna formed by the antenna and the further antenna along a further spatial direction, which is different than the spatial direction.

In some exemplary embodiments the radar chip is configured to digitally process radar received signals of the antenna and of the further antenna in order to perform a digital beamforming processing in a further spatial direction, which is different than the spatial direction.

Moreover, exemplary embodiments concern a method for adjusting an antenna parameter of an antenna having at least two elements for emitting and/or receiving electromagnetic radiation. The antenna is arranged on a support substrate. The method comprises generating a control signal for an electromechanical actuator arranged on the support substrate based on a target value for the antenna parameter. Furthermore, the method comprises adjusting a distance between the at least two elements of the antenna along a spatial direction for the purpose of influencing the antenna parameter by mechanically deforming the support substrate along the spatial direction by means of the electromechanical actuator and based on the control signal.

According to some exemplary embodiment the method also comprises determining a measured value for the distance between the at least two elements of the antenna along the spatial direction by means of a sensor, wherein the generating of the control signal is further based on the measured value.

In some exemplary embodiments the antenna parameter is a main focus direction of the antenna.

Exemplary embodiments of the present disclosure can allow electromechanical control of the main focus direction of antennas.

The aspects and features described together with one or more of the previously detailed examples and figures can also be combined with one or more of the other examples in order to replace an identical feature of the other example or in order to additionally introduce the feature into the other example.

The description and drawings present only the principles of the disclosure. Additionally, all examples mentioned here are intended to be used in principle expressly only for illustrative purposes, in order to assist the reader in understanding the principles of the disclosure and the concepts contributed by the inventor(s) for further development of the art. All statements herein regarding principles, aspects and examples of the disclosure and also concrete examples thereof encompass the counterparts thereof.

A block diagram can depict for example a rough circuit diagram that implements the principles of the disclosure. In a similar manner, a flow diagram, a flowchart, a state transition diagram, a pseudocode and the like can represent various processes, operations or steps that are represented for example substantially in a computer-readable medium and are thus performed by a computer or processor, regardless of whether such a computer or processor is explicitly shown. Methods disclosed in the description or in the patent claims can be implemented by a component having a means for performing each of the respective steps of said methods.

It goes without saying that the disclosure of multiple steps, processes, operations or functions disclosed in the description or the claims should not be interpreted as being in the specific order, unless this is explicitly or implicitly indicated otherwise, for example for technical reasons. The disclosure of multiple steps or functions therefore does not limit them to a specific order unless said steps or functions are not interchangeable for technical reasons. Furthermore, in some examples, an individual step, function, process or operation can include multiple partial steps, functions, processes or operations and/or be subdivided into them. Such partial steps can be included and be part of the disclosure of said individual step, provided that they are not explicitly excluded.

Additionally, the claims that follow are hereby incorporated in the detailed description, where each claim can be representative of a separate example by itself. While each claim can be representative of a separate example by itself, it should be borne in mind that although a dependent claim can refer in the claims to a specific combination with one or more other claims other examples can also encompass a combination of the dependent claim with the subject matter of any other dependent or independent claim. Such combinations are explicitly proposed here, provided that no indication is given that a specific combination is not intended. Furthermore, features of a claim are also intended to be included for any other independent claim, even if this claim is not made directly dependent on the independent claim.

What is claimed is:

1. An antenna unit, comprising:
an antenna having at least two elements configured to emit, receive, or emit and receive electromagnetic radiation, wherein the antenna is arranged on a support substrate;
an electromechanical actuator that is arranged on the support substrate and configured to, based on a control signal, mechanically deform the support substrate along a spatial direction in order to adjust a distance between the at least two elements of the antenna along the spatial direction to influence an antenna parameter of the antenna,
wherein the spatial direction is parallel to a surface of the support substrate; and
a control circuit configured to generate the control signal based on a target value for the antenna parameter.

2. The antenna unit as claimed in claim 1, further comprising:
a sensor configured to determine a measured value for the distance between the at least two elements of the antenna along the spatial direction, wherein the control circuit is further configured to generate the control signal based on the measured value.

3. The antenna unit as claimed in claim 1, wherein the antenna parameter is a main focus direction of the antenna, wherein the main focus direction denotes a direction of a main lobe of the antenna in an antenna pattern.

4. The antenna unit as claimed in claim 1, wherein the control circuit is further configured to generate the control signal based on information concerning an orientation of the antenna unit.

5. The antenna unit as claimed in claim 1, wherein the at least two elements of the antenna are coupled to one another via a line running on the support substrate, and wherein a length of the line varies depending on the mechanical deformation of the support substrate along the spatial direction by the electromechanical actuator.

6. The antenna unit as claimed in claim 5, wherein the line runs meandrously on the support substrate.

7. The antenna unit as claimed in claim 1, wherein the electromechanical actuator is a piezomechanical actuator.

8. The antenna unit as claimed in claim 1, wherein the at least two elements of the antenna are patch antennas.

9. The antenna unit as claimed in claim 1, wherein the antenna is a slot antenna, and wherein the at least two elements of the antenna are slots in the slot antenna.

10. The antenna unit as claimed in claim 1, wherein the electromechanical actuator is configured to mechanically deform the support substrate along the spatial direction by at least 1% of a wavelength of the electromagnetic radiation.

11. The antenna unit as claimed in claim 1, wherein the support substrate is a printed circuit board.

12. A radar system, comprising:
an antenna unit; and
a radar chip coupled to the antenna unit,
wherein the antenna unit comprises:
an antenna having at least two elements configured to emit, receive, or emit and receive electromagnetic radiation, wherein the antenna is arranged on a support substrate;
an electromechanical actuator that is arranged on the support substrate and configured to, based on a control signal, mechanically deform the support substrate along a spatial direction to adjust a distance between the at least two elements of the antenna along the spatial direction to influence an antenna parameter of the antenna,
wherein the spatial direction is parallel to a surface of the support substrate; and
a control circuit configured to generate the control signal based on a target value for the antenna parameter.

13. The radar system as claimed in claim 12, wherein the radar chip is configured to at least one of:
process a radar received signal generated based on electromagnetic radiation received by the antenna, or
generate a radar transmission signal for emission as electromagnetic radiation by the antenna.

14. The radar system as claimed in claim 12, wherein the antenna unit comprises:
a further antenna having at least two further elements configured to emit, receive, or emit and receive electromagnetic radiation,
wherein the further antenna is arranged on the support substrate, and
wherein the electromechanical actuator is configured to adjust the mechanical deformation of the support substrate along the spatial direction to adjust a distance between the at least two further elements of the further antenna along the spatial direction to influence an antenna parameter of the further antenna.

15. The radar system as claimed in claim 14, wherein:
the antenna parameter of the antenna is a main focus direction of the antenna along the spatial direction,
the antenna parameter of the further antenna is a main focus direction of the further antenna along the spatial direction, and
the antenna parameter of the antenna and the antenna parameter of the further antenna are adjusted via the mechanical deformation to adjust a main focus direction of an antenna group comprising the antenna and the further antenna.

16. The radar system as claimed in claim 15, wherein the control circuit is configured to generate the control signal such that the main focus direction of the antenna group oscillates along the spatial direction.

17. The radar system as claimed in claim 15, wherein the radar chip is configured to generate radar transmission signals having a predetermined phase relationship with respect to one another for the antenna and the further antenna to adjust the main focus direction of the antenna group along a further spatial direction that is different than the spatial direction.

18. The radar system as claimed in claim 15, wherein the radar chip is configured to digitally process radar received signals of the antenna and of the further antenna to perform a digital beamforming processing in a further spatial direction that is different than the spatial direction.

19. A method for adjusting an antenna parameter of an antenna having at least two elements for emitting, receiving, or emitting and receiving electromagnetic radiation, wherein the antenna is arranged on a support substrate, the method comprising:

generating a control signal for an electromechanical actuator arranged on the support substrate based on a target value for the antenna parameter; and adjusting, based on the control signal, a distance between the at least two elements of the antenna along a spatial direction to influence the antenna parameter by utilizing the electromechanical actuator to mechanically deform the support substrate along the spatial direction,
wherein the spatial direction is parallel to a surface of the support substrate, and
wherein the control signal controls an amount of mechanical deformation of the support substrate along the spatial direction.

20. The method as claimed in claim 19, further comprising:

determining a measured value for the distance between the at least two elements of the antenna along the spatial direction based on sensor data determined by a sensor,
wherein generating the control signal is based on the measured value.

* * * * *